(12) United States Patent
Wang

(10) Patent No.: US 8,966,583 B2
(45) Date of Patent: *Feb. 24, 2015

(54) METHOD, APPARATUS AND SERVER FOR USER VERIFICATION

(71) Applicant: Alibaba Group Holding Limited, Grand Cayman (KY)

(72) Inventor: Liangjing Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/133,197

(22) Filed: Dec. 18, 2013

(65) Prior Publication Data

US 2014/0373178 A1 Dec. 18, 2014

Related U.S. Application Data

(63) Continuation of application No. 12/918,567, filed as application No. PCT/US2010/042544 on Jul. 20, 2010, now Pat. No. 8,667,561.

(30) Foreign Application Priority Data

Sep. 1, 2009 (CN) .......................... 2009 1 0168184

(51) Int. Cl.
*G06F 7/04* (2006.01)
*G06F 21/36* (2013.01)
*G06F 17/30* (2006.01)
(52) U.S. Cl.
CPC .......... *G06F 21/36* (2013.01); *G06F 17/30244* (2013.01)
USPC .......................................................... 726/2
(58) Field of Classification Search
USPC ............................................................ 726/2
See application file for complete search history.

(56) References Cited

U.S. PATENT DOCUMENTS

2004/0030934 A1 2/2004 Mizoguchi et al.
2005/0283615 A1 12/2005 Chakravarthi et al.
(Continued)

FOREIGN PATENT DOCUMENTS

| CN | 101179381 A | 5/2008 |
| CN | 101388078 A | 3/2009 |
| JP | 2009163283 | 7/2009 |
| JP | 2010067096 | 3/2010 |

OTHER PUBLICATIONS

Translated Japanese Office Action mailed Sep. 2, 2014 for Japanese patent application No. 2012-526762, a counterpart foreign application of U.S. Appl. No. 12/918,567, 9 pages.

(Continued)

*Primary Examiner* — Teshome Hailu
(74) *Attorney, Agent, or Firm* — Lee & Hayes, PLLC

(57) ABSTRACT

The present disclosure discloses a method, apparatus, and server for user verification to store a plurality of pictures in a database and define a plurality of rotational directions. The method includes: when receiving from a client a request for a checkcode, rotating a picture retrieved from a database according to a defined rotational direction; after storing a correlation between an identification of the client and the rotational direction of the retrieved picture, outputting the rotated picture to the client; receiving a rotational direction of the picture from the client; finding the stored correlation between the identification of the client and the stored rotational direction of the retrieved picture according to the identification of the client; determining whether or not the rotational direction of the picture returned from the client matches the stored rotational direction. If they match, user verification is passed; otherwise, the user verification is failed. The large number of pictures in the database makes it difficult for enumeration. In addition, by using the rotational direction as identification information to verify user, the safety and accuracy of user verification can be enhanced.

14 Claims, 6 Drawing Sheets

(56) References Cited

U.S. PATENT DOCUMENTS

| | | |
|---|---|---|
| 2007/0094717 A1* | 4/2007 | Srinivasan et al. .............. 726/5 |
| 2008/0201578 A1* | 8/2008 | Drake ......................... 713/172 |
| 2008/0244700 A1 | 10/2008 | Osborn et al. |
| 2009/0025072 A1 | 1/2009 | Kondo |
| 2009/0038006 A1* | 2/2009 | Traenkenschuh et al. ...... 726/21 |
| 2009/0094690 A1 | 4/2009 | Hayashi |
| 2009/0199295 A1* | 8/2009 | Shih et al. ...................... 726/18 |
| 2009/0320124 A1 | 12/2009 | Taxier et al. |
| 2010/0043062 A1 | 2/2010 | Alexander et al. |
| 2010/0050242 A1 | 2/2010 | Delia et al. |
| 2010/0180336 A1 | 7/2010 | Jones et al. |

OTHER PUBLICATIONS

The Chinese Office Action dated Dec. 4, 2012 for Chinese patent application No. 200910168184.1, a counterpart foreign application of U.S. Appl. No. 12/918,567 13 pages.

Gossweiler et al, "What's Up CAPTCHA? A CAPTCHA Based on Image Orientation", Proc 18th Intl Conf on World Wide Web, Apr. 2009, 6 pgs.

Non-Final Office Action for U.S. Appl. No. 12/918,567, mailed on Dec. 5, 2012, Liangjing Wang, "Method, Apparatus and Server for User Verification", 8 pages.

Non-Final Office Action for U.S. Appl. No. 12/918,567, mailed on Jun. 12, 2013 Liangjing Wang, "Method, Apparatus and Server for User Verification", 8 pages.

Translated Japanese Office Action mailed Mar. 11, 2014 for Japanese patent application No. 2012-526762, a counterpart foreign application of U.S. Appl. No. 12/918,567, 9 pages.

Masuda, "Creating a Practical CAPTCHA Image Generation Program", Nikkei Software, vol. 10, No. 2, Dec. 2006, pp. 86-88.

Translation of Chinese office action from corresponding Chinese patent application No. 200910168184.1, dated Aug. 28, 2013, 11 pages.

* cited by examiner

METHOD, APPARATUS AND SERVER FOR USER VERIFICATION

CROSS REFERENCE TO RELATED PATENT APPLICATIONS

This Application claims priority to U.S. patent application Ser. No. 12/918,567, filed Aug. 20, 2010, which is a national stage application of an international patent application PCT/US10/42544, filed Jul. 20, 2010, which claims priority from Chinese Patent Application No. 200910168184.1, filed Sep. 1, 2009, entitled "METHOD, APPARATUS AND SERVER FOR USER VERIFICATION," which applications are hereby incorporated in their entirety by reference.

TECHNICAL FIELD

The present disclosure relates to network communication technology field, and particularly relates to a method, apparatus and server for user verification.

BACKGROUND

A checkcode is an image used in a network to prevent a webpage from attacks by a malicious script. There are four variables when using a checkcode in a verification process, including: a user identification ("uid"), a checkcode picture ("pic"), content of the checkcode picture ("ans"), and a content value input by a user after identification of the checkcode picture ("ans2"). When the user requests for the checkcode through uid at a terminal, a checkcode server randomly generates the ans according to a preset rule, draws a corresponding pic according to the generated ans or obtains a corresponding pic from a preset picture database, and returns a result to the user's terminal. The uid and ans are stored as a pair key in a database. After the terminal outputs pic, the user inputs the ans2 of the pic. Then, ans2 is submitted to a checkcode server. The checkcode server obtains the ans in the database according to the uid, and compares the ans with the ans2. If the two variables match, the user passes the verification.

While researching and implementing the current technologies, Applicant found the following problems with respect to the existing technologies. During the generation of the checkcode, the checkcode is generally comprised of characters with some appearance variation. As there are only a limited number of characters, there are only a limited number of generated pics which can be easy to be enumerated. When there is less amount of variation of the characters, the characters can be easily identified by machines. When there is greater amount of variation of the characters, the difficulty of manual identification is increased. Consequently, the safety and accuracy of user verification is reduced although verification by machine is difficult.

SUMMARY OF THE DISCLOSURE

An objective of the present disclosure is to provide a method, apparatus and server for user verification to solve the problems that a checkcode is easy to be enumerated and the checkcode is easily identifiable by machines or difficult to be identified by a user due to extent of deformation, which causes reduction of safety and accuracy of the user verification.

To solve the above problems, the present disclosure provides a method for user verification as described below.

A method for user verification pre-stores a plurality of pictures in a database and defines a plurality of rotational directions. The method includes a number of actions described below.

upon receiving a request from a client for a checkcode, rotating a picture retrieved from a database according to a defined rotational direction;

after storing a corresponding relationship between an identification of the client and the rotational direction of the retrieved picture, providing the rotated picture to the client;

receiving a rotational direction of the picture from the client;

identifying the stored correlation between an identification of the client and the defined rotational direction of the retrieved picture according to the identification of the client; and determining whether the rotational direction of the picture returned from the client matches the defined rotational direction; if there is a match, indicating passing of user verification; otherwise, indicating failure of the user verification.

The present disclosure also provides an apparatus for user verification, which includes components as described below.

a store unit that stores a plurality of pictures in a database;
a definition unit that defines a plurality of rotational directions;
a rotation unit that rotates a picture retrieved from the database according to a defined rotational direction when receiving a request from a client for a checkcode;
a storage unit that stores a correlation between an identification of the client and the defined rotational direction of the retrieved picture;
an output unit that outputs the rotated picture to the client;
a receiving unit that receives a rotational direction of the picture from the client;
a finding unit that finds the stored correlation between the identification of the client and the defined rotational direction of the retrieved picture according to the identification of the client; and
a verification unit that determines whether or not the rotational direction of the picture returned from the client matches the defined rotational direction; if there is a match, indicates passing of a user verification; otherwise, indicates failure of the user verification.

The present disclosure also provides a server for user verification, which includes: a database, a checkcode generation module, and a user verification module, wherein:

the database stores a plurality of pictures;
the checkcode generation module rotates a picture retrieved from the database according to a defined rotational direction upon receiving a request from a client for a checkcode, stores a correlation between an identification of the client and the rotational direction of the retrieved picture, and outputs the rotated picture to the client;
a user verification module that finds the stored correlation between the identification of the client and the stored rotational direction of the retrieved picture according to the identification of the client after receiving a rotational direction of the picture from the client, determines whether or not the rotational direction of the picture from the client matches the stored rotational direction; if there is a match, indicates passing of a user verification; otherwise, indicates failure of the user verification.

In the present disclosure, as there are many pictures including but not limited to characters and numbers in the database, it is not easy to be enumerated. In addition, by rotating the picture and using the rotational direction as identification information to verify the user, as the user can quickly identify the rotational direction of the picture by eyes, thus it is easier for user verification. As the pictures are not normalized information as characters, they are hard to be identified by machines and thus the safety and accuracy of user verification is enhanced.

DESCRIPTION OF DRAWINGS

To better illustrate embodiments of the present disclosure or technology plans of existing technologies, the following is a brief introduction of figures to be used in descriptions of the embodiments or the existing technologies. The following figures just relate to some embodiments of the present disclosure. A person of ordinary skill in the art can obtain other figures according to the f without creativity.

DETAILED DESCRIPTION

The present disclosure provides a method, apparatus and a server for user verification.

The detailed description refers to the accompanying figures so that a person of ordinary skill in the art can better understand the technical scheme in the embodiments of the present disclosure.

To better illustrate the embodiments, the present disclosure divides a method for user verification into two parts, namely checkcode generation process and application of the checkcode for user verification. A complete embodiment of the method for user verification comprises these two parts.

Figure 1:
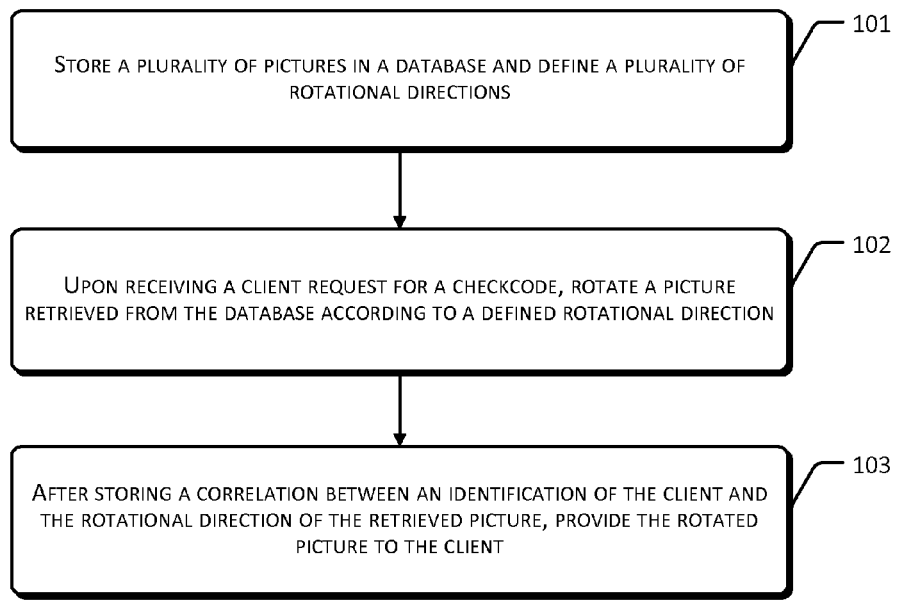
FIG. 1 shows a flowchart of a first embodiment of a checkcode generation process in accordance with the present disclosure.

FIG. 1 shows a flowchart of a first embodiment of generation of a checkcode.

At 101, a plurality of pictures are stored in a database and a plurality of rotational directions are defined.

The a plurality of pictures stored in the database are usually pictures that can each be expressly identified with a respective rotational direction after a rotational operation. For example, in the rotating process, the rotational direction of the picture of a tree can be identified by a direction of a treetop or a tree root. There are pictures that cannot easily be identified with a rotational direction. As an example, given a picture of a wheel, it is difficult to identify the rotational direction as the wheel is round.

A definition of the rotational direction of a picture can be conducted according to a system need. The defined rotational direction needs to be identified from the perspective of a user's eyes. For example, there can be four defined rotational directions (up, down, left, and right) or there can be eight defined rotational directions (up, down, left, right, up-left, down-left, up-right, and down-right). The embodiments of the present disclosure are not limited to any number of rotational directions and types.

For easy configuration and implementation system, each defined rotational direction corresponds to a parameter value. The parameter value refers to a character or a combination of characters input by an input device, such as a keyboard for example, by a client. The character may be a number, an alphabet (can differentiate capitalized or small-case alphabets), a symbol, etc. The embodiments of the present disclosure are not limited to the detailed setup of the parameter value corresponding to the rotational direction, which can be flexible depending on the need.

At 102, when a request for a checkcode is received from the client, a picture retrieved from the database is rotated according to a defined rotational direction.

A number of pictures can be retrieved from the database, preferably three to five. Too few pictures may result in less-than-ideal safety of user verification. Too many pictures may hamper a user's experience in the verification process. The method comprises randomly rotating the retrieved pictures according to a defined rotational direction, or randomly generating a group of rotational direction parameter values according to defined rotational directions; retrieving pictures from the database with a number that is the same as the number of the group of rotational direction parameter values; and then rotating the retrieved pictures according to the group of rotational direction parameter values.

At 103, after storing a correlation between an identification of the client and the rotational direction of the retrieved picture, the rotated picture is provided or output to the client.

The rotated pictures can be joined into one picture and then provided to the client. Alternatively, the rotated pictures can be provided to the client in the form of a flash.

Figure 2:
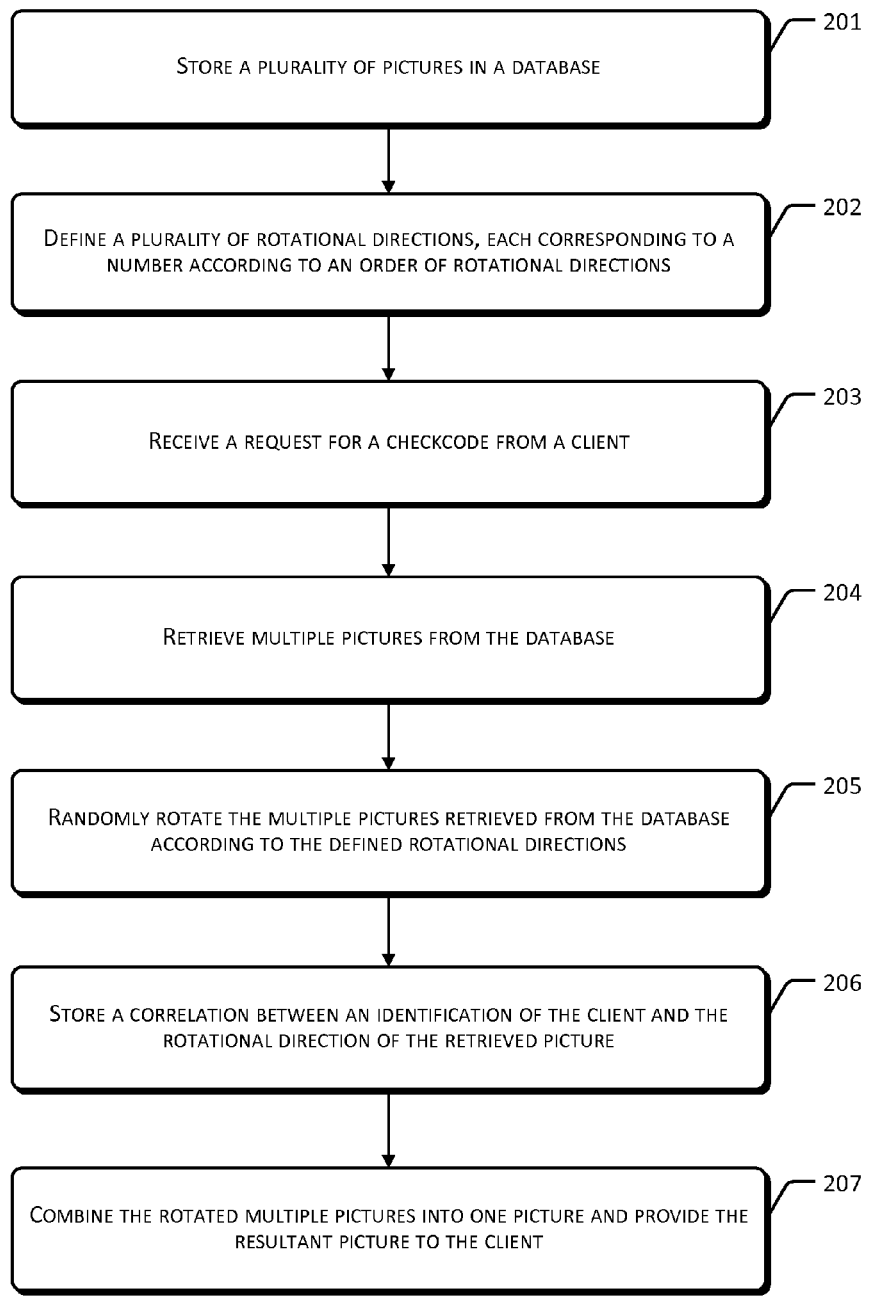
FIG. 2 shows a flowchart of a second embodiment of a checkcode generation process in accordance with the present disclosure.

FIG. 2 shows a flowchart of a second embodiment of a method of checkcode generation.

At 201, a plurality of pictures are stored in a database.

The a plurality of pictures stored in the database are usually pictures that can each be expressly identified with a respective rotational direction after a rotational operation. For example, in the rotating process, the rotational direction of the picture of a tree can be identified by a direction of the treetop or the tree root. There are pictures that cannot be identified with a rotational direction. As an example, given a picture of a wheel, it is difficult to identify the rotational direction of the picture as the wheel is round.

At 202, a plurality of rotational directions are defined, each of the a plurality of rotational directions corresponding to a number according to an order of rotational directions.

As an example of eight defined clockwise rotational directions, these directions include: up, up-right, right, down-right, down, down-left, left, and up-left. In user verification, for the convenience of a user to input a rotational direction, each rotational direction can correspond to a number. For example, the direction "up" corresponds to 0, "up right" to 1, "right" to 2, "down-right" to 3, "down" to 4, "down-left" to 5, "left" to 6, and "up-left" to 7.

Although this embodiment provides a detailed configuration to associate each of the rotational directions with a respective number, the present disclosure is not limited by the example. The embodiments of the present disclosure can also associate the rotational directions with alphabets, symbols, numbers, or any combination thereof.

At 203, a request for a checkcode is received from the client.

At 204, a plurality of pictures are retrieved from the database.

In the process of retrieving a plurality of pictures, a different number of pictures can be randomly retrieved each time or the number of pictures retrieved may be within a predefined threshold range. For example, the predefined threshold is preferably between 3 and 5. Too few pictures may result in less-than-ideal safety of user verification. Too many pictures may hamper a user's experience in the verification process. Users might get bored if required to input too much information.

At 205, the a plurality of pictures retrieved from the database are randomly rotated according to the defined rotational directions.

In the example of predefined eight rotational directions, when five pictures are randomly retrieved from the database, each picture is rotated according to a random selection of the rotational direction. For example, the five pictures may be randomly rotated in the directions of up, up-left, right, down-right, and up-right.

At 206, a correlation between an identification of the client and the rotational direction of the retrieved picture is stored.

With the five pictures rotated in the directions of up, up-left, right, down-right, and up-right, respectively, corresponding numbers may be respectively assigned to the above five rotational directions such as, for example, 0, 7, 2, 3, and 1. In this example, correlation between the identification of the client and 07321 are stored.

At 207, after combining the rotated a plurality of pictures into one picture, the one resultant picture is provided to the client.

For example, the five rotated pictures can be combined into one picture according to a chronological order before being provided to the client so that a user can identify the rotational directions of the pictures according to the chronological order.

Figure 3:
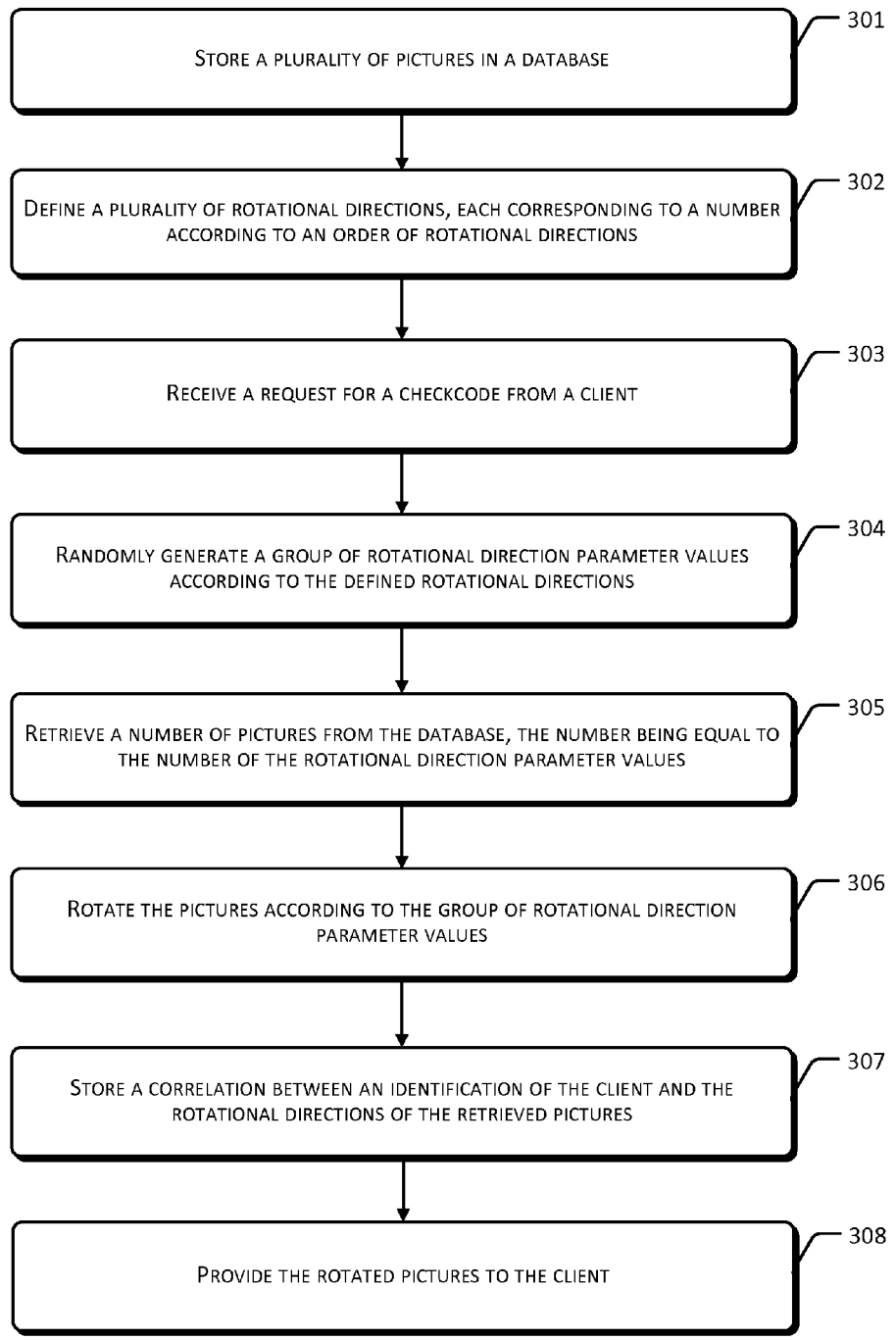
FIG. 3 shows a flowchart of a third embodiment of a checkcode generation process in accordance with the present disclosure.

FIG. 3 shows a flowchart of a third embodiment of a method of checkcode generation.

At 301, a plurality of pictures are stored in a database.

The a plurality of pictures stored in the database are usually pictures that can each be expressly identified with a respective rotational direction after a rotational operation. For example, in the rotating process, the rotational direction of the picture of a tree can be identified by a direction of the treetop or the tree root. There are pictures that cannot be identified with a rotational direction. As an example, given a picture of a wheel, it is difficult to identify the rotational direction of the picture as the wheel is round.

At 302, a plurality of rotational directions are defined with each corresponding to a number according to an order of rotational directions. As an example, eight defined clockwise rotational directions may include: up, up-right, right, down-right, down, down-left, left, and up-left. In user verification, for the convenience of a user to input a rotational direction, each rotational direction can correspond to a number. For example, the direction "up" corresponds to 0, "up right" to 1, "right" to 2, "down-right" to 3, "down" to 4, "down-left" to 5, "left" to 6, and "up-left" to 7.

Although this embodiment provides a detailed configuration to associate each of the rotational directions with a respective number, the present disclosure is not limited by the example. The embodiments of the present disclosure can also associate the rotational directions with alphabets, symbols, numbers, or any combination thereof.

At 303, a request for a checkcode is received from a client.

At 304, a group of rotational direction parameter values are randomly generated according to the defined rotational directions, As an example of eight defined clockwise rotational directions, the group of rotational direction parameter values randomly generated can include a combination of any number of parameter values of rotational directions. Preferably, the number is between 3 and 5. For example, a group of rotational direction parameter values randomly generated is 07231 (up, up left, right, down right, and up right).

At 305, a number of pictures are retrieved from the database; the number is equal to a number of the group of rotational direction parameter values.

The group of rotational direction parameter values randomly generated may include five rotational directions. Then five pictures are randomly retrieved from the database.

At 306, the pictures are rotated according to the group of rotational direction parameter values.

The retrieved five pictures are rotated respectively according to the group of rotational direction parameter values. As an example, a first picture is rotated up, a second picture is rotated up-left, a third picture is rotated right, a third picture is updated down-right, and a fifth picture is rotated up-right.

At 307, a correlation between an identification of the client and the rotational directions of the retrieved pictures is stored.

As an example, a correlation between an identification of the client and 07321 is stored according to the group of rotational direction parameter values generated at 304.

At 308, the rotated pictures are provided, e.g., in a form of flash, to the client.

The five rotated pictures can be provided to the client in the form of flash. In other words, the five pictures may be displayed in an chronological order to the user so that the user can identify the rotational directions of the pictures.

The following embodiments of the user verification apply a checkcode generated by any of the above embodiments of checkcode generation for user verification.

Figure 4:
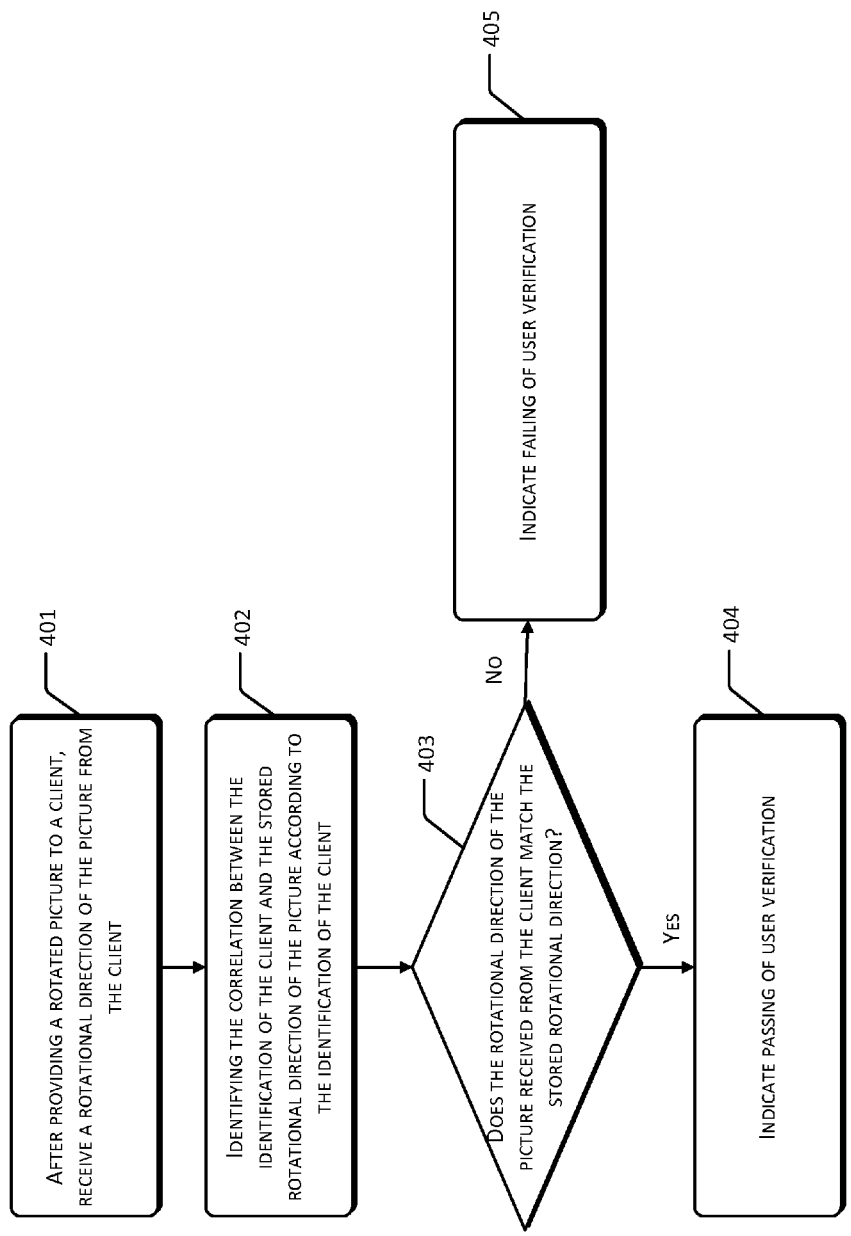
FIG. 4 shows a flowchart of using a checkcode generated by an embodiment of the present disclosure to verify user.

FIG. 4 shows a flowchart of an embodiment of user verification in accordance with the present disclosure.

At 401, after providing a rotated picture to a client, a rotational direction of the picture is received from the client.

In combination with the above embodiments of checkcode generation, when the rotated picture is provided to the client, the client can input a rotational direction parameter value of the rotated picture. For example, when the rotational direction's parameter value is a number, the user inputs the number representative of the rotational direction. Alternatively, the user can also use a mouse to rotate the picture into a desired direction, a result of the rotation may be digitized, and the rotational direction parameter value is generated and returned.

In the above process of checkcode generation, a plurality of rotational directions have already been defined and each rotational direction corresponds to a parameter value. As an example of numeric parameter value, supposedly there are eight directions which are up, up-right, right, down-right, down, down-left, left, and up-left. For example, the rotational direction "up" may correspond to 0, "up-right" to 1, "right" to 2, "down-right" to 3, "down" to 4, "down-left" to 5, "left" to 6, and "up-left" to 7. Based on such configuration, when the user enters into the verification process, the system can display the corresponding relationship of the above configuration at a user verification webpage. For example, there are some explanations below a verification box to describe the configuration and the user knows the rules of the configuration according to such description. The user, according to the rotated picture displayed at the user verification webpage, inputs the number corresponding to the rotational direction of each picture in the verification box.

The user can also use the mouse to rotate the picture to return the rotational direction to the system, which is generally based on the third embodiment of checkcode generation described previously. For example, the system can output the rotated picture to the client in the form of flash. When the user conducts rotational operation of the picture in flash, the flash program can capture corresponding mouse operations and calculate the corresponding rotational direction. When the user conducts rotational operations on all of the pictures, the flash program can merge all rotational directions. The method to implement picture rotation is generally the same as the various implementations based on the flash program. In the interest of brevity, the details will not be provided herewith.

At 402, the stored correlation between the identification of the client and the stored rotational direction of the retrieved picture is identified and retrieved according to the identification of the client.

At 403, whether or not the rotational direction of the picture returned from the client matches the stored rotational direction is determined. If there is a match, proceed to 404; otherwise proceed to 405.

At 404, an indication of passing the user verification is provided.

At 405, an indication of failing the user verification is provided.

In the embodiments of the present disclosure, as there may be a large number of pictures stored in the database and the pictures are not limited to tend number (0, 1, 2, . . . 9) and twenty-six uppercase letters and twenty-six lowercase letters, there is a very low probability that the same picture reappears. As a picture is not normalized information as characters, a machine cannot easily identify it. In addition, there is only rotational operation of the picture, which is unlike deformation operation that increases identification difficulty by the user's eyes. The disclosed embodiments do not increase the difficult for user identification.

Corresponding to the embodiments of the present disclosure in the method for user verification, the present disclosure also provides embodiments of an apparatus for user verification and a server for user verification.

Figure 5:
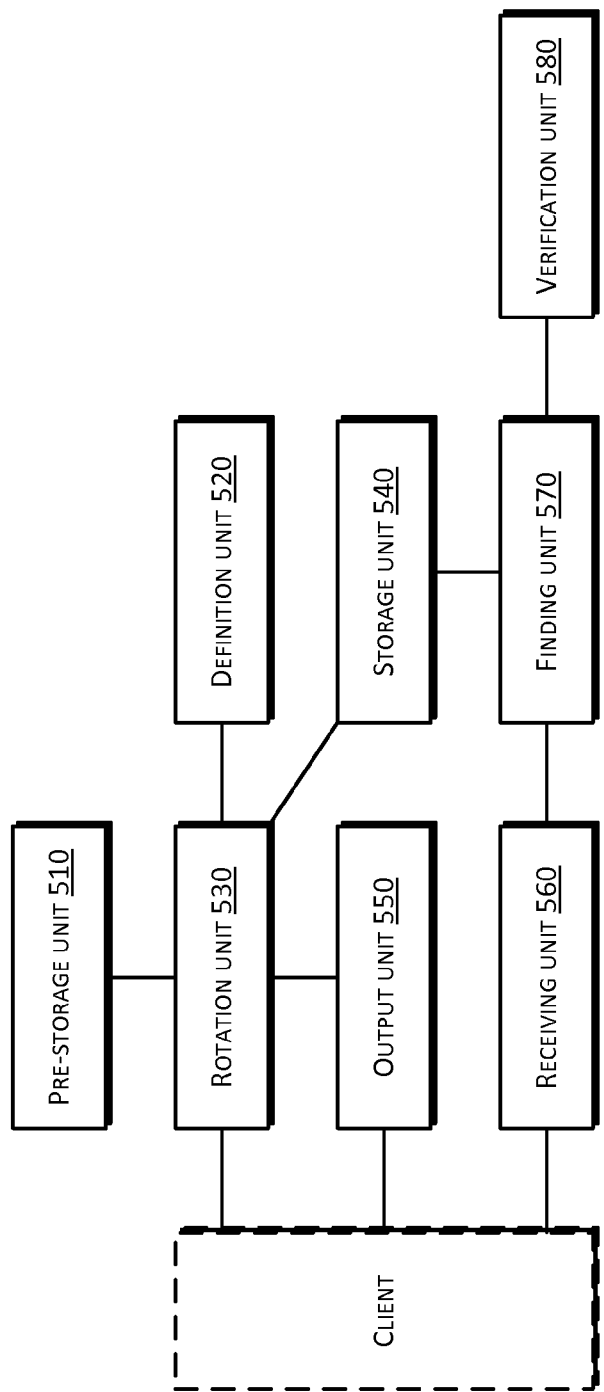
FIG. 5 shows a diagram of an apparatus for user verification in accordance with the present disclosure.

FIG. 5 shows a diagram of an embodiment of an apparatus for user verification in accordance with the present disclosure.

The apparatus includes: a storage unit 510, a definition unit 520, a rotation unit 530, a storage unit 540, an output unit 550, a receiving unit 560, a finding unit 570, and a verification unit 580.

Storage unit 510 stores a plurality of pictures in a database.

Definition unit 520 defines a plurality of rotational directions.

Rotation unit 530 rotates a picture retrieved from the database according to a defined rotational direction when a request for checkcode is received from a client.

Storage unit 540 stores a correlation between an identification of the client and the rotational direction of the retrieved picture.

Output unit 550 outputs the rotated picture to the client.

Receiving unit 560 receives a rotational direction of the picture received from the client.

Finding unit 570 finds or identifies the stored correlation between the identification of the client and the stored rotational direction of the retrieved picture according to the identification of the client.

Verification unit 580 determines whether or not the rotational direction of the picture received from the client matches the stored rotational direction. If they match, passing of the user verification is indicated; otherwise, failing of the user verification is indicated.

Definition unit 520 can include (not shown in FIG. 5): a direction setup unit configured to set up rotational directions of one or more pictures, and a direction match unit configured to match each rotational direction with a parameter value according to an order that the rotational directions are set up.

Rotation unit 530 can include (not shown in FIG. 5): a picture retrieval unit configured to retrieve a number of pictures from the database, and a random rotation unit configured to randomly rotate the retrieved pictures according to the defined rotational directions.

Rotation unit 530 can also include (not shown in FIG. 5): a random generation unit configured to randomly generate a group of rotational direction parameter values according to the defined rotational directions, a rotation retrieval unit configured to retrieve a number of pictures with the number equal to the number of the group of rotational direction parameter values retrieved from the database, and a picture rotation unit configured to rotate the pictures according to the group of rotational direction parameter values.

Figure 6:
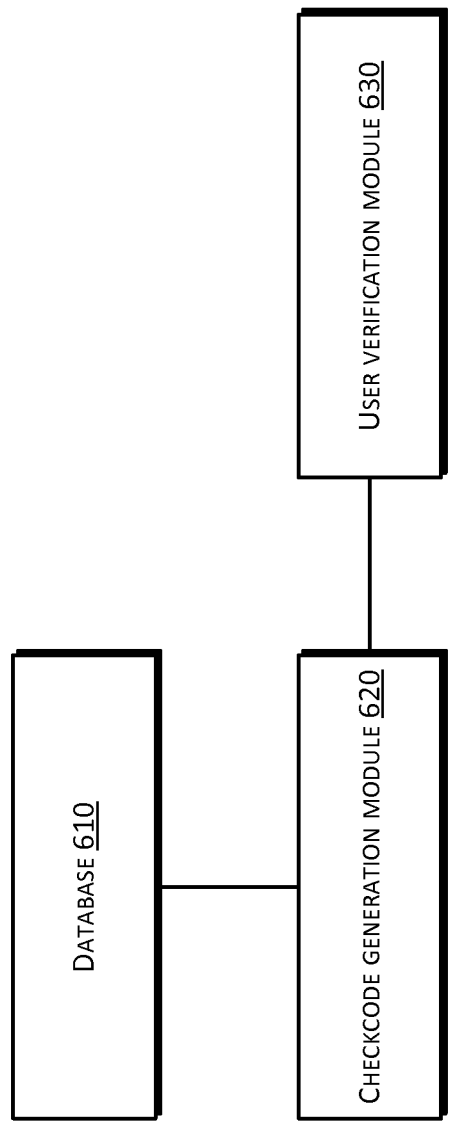
FIG. 6 shows a diagram of a server for user verification in accordance with the present disclosure.

FIG. 6 shows a diagram of a server for user verification in accordance with the present disclosure.

The server includes: a database 610, a checkcode generation module 620, and a user verification module 630.

Database 610 stores a plurality of pictures in a database.

Checkcode generation module 620 rotates a picture retrieved from the database according to a defined rotational direction when a request for checkcode is received from a client. The checkcode generation module 620 also stores a correlation between an identification of the client and the rotational direction of the retrieved picture, and outputs the rotated picture to the client.

User verification module 630 finds or identifies the stored correlation between the identification of the client and the stored rotational direction of the retrieved picture according to the identification of the client after receiving a rotational direction of the picture from the client. The user verification module 630 also determines whether or not the rotational direction of the picture received from the client matches the stored rotational direction. If they match, passing of the user verification is indicated; otherwise, failing of the user verification is indicated.

The present disclosure shows that, when a request for checkcode is received from a client, a picture retrieved from the database is rotated according to a defined rotational direction. A correlation between an identification of the client and the rotational direction of the retrieved picture is stored. The rotated picture is output to the client. A rotational direction of the picture is received from the client. The correlation between the identification of the client and the stored rotational direction of the retrieved picture is identified according to the identification of the client. Whether or not the rotational direction of the picture returned from the client matches the stored rotational direction is determined. If they match, the user verification is passed; otherwise it is failed. In the present disclosure, as there are many pictures including but not limited to characters and numbers in the database, it is not easy to be enumerated. In addition, by rotating a picture and using the rotational direction as identification information to verify the user, the user can quickly identify the rotational direction of the picture by the user's eyes, thus it is easier for user verification. As pictures are not normalized information as characters are, pictures are more difficult to be identified by machines and thus the safety and accuracy of user verification is increased.

From descriptions of the above embodiments, a person of ordinary skill in the art can clearly understand that the present disclosure can be implemented by software with necessary hardware platform. Based on such understanding, the proposed techniques of the present disclosure in essence or the portion of which contributes to the existing technologies can be presented in a form of software product. Such software product can be stored in a storage media such as ROM/RAM, CD, computer memory hardware, etc, and may include a plurality of instructions so that a computing device (which can be a personal computer, a server, or a network device for example) can implement various embodiments or some portions of the embodiments of the present disclosure.

Each embodiment of the present disclosure is described progressively. The same or similar portion of each embodiment can reference to each other. Each embodiment emphasizes on the portions different from the other. Especially, for the reference of the system embodiment, it is basically similar to the method embodiment. Thus the relevant description is relatively simple. Similar portions can refer to those in the method embodiment.

The present disclosure can be used in various general or special computing system environment or configuration such as personal computer, server computer, hand-held device or portable device, tablet device, multi-processor system, micro-processor system, set-top box, programmable electronic consumer device, network PC, small computer, mainframe computer, any distribution computing environment including any of the above systems or devices, etc.

The present disclosure can be described by context of enforceable instructions enforced by computer, such as program module. Generally, program module includes process, program, object, group, data structure to implement specific task or realized specific abstract data type. The present disclosure can also be implemented in a distributed computing environment. In such distributed computing environment, a remote processing device communicatively coupled by communication networks can implement the tasks. In the distribution computing environment, the program module can locate at local or remote computer storage media including storage device.

Although the present disclosure is described by the embodiments, a person of ordinary skill in the car can appreciate that there can be many variances or modification without deviating from the spirit of the present disclosure. The appended claims cover those variances and modifications without deviating from the spirit of the present disclosure.

What is claimed is:

1. A method for user verification, the method comprising:
    storing a plurality of pictures in a computer readable storage device;
    defining a plurality of rotational directions;
    rotating a picture retrieved from the computer readable storage device according to a defined rotational direction in response to receiving from a client a request for a checkcode;
    after rotating the picture, providing the picture to the client;
    receiving a rotational direction of the picture from the client;
    identifying a correlation between an identification of the client and the rotational direction of the retrieved picture according to the identification of the client;
    determining whether the rotational direction of the picture received from the client matches the rotational direction of the rotating picture retrieved from the computer readable storage device,
    wherein user verification is indicated when the rotational direction of the picture received from the client matches the rotational direction of the rotating picture retrieved from the computer readable storage device.

2. The method as recited in claim 1, wherein defining a plurality of rotational directions comprises:
    defining a plurality of rotational directions of the picture; and
    associating each direction with a parameter value according to an order of rotational directions.

3. The method as recited in claim 2, wherein rotating a picture retrieved from the computer readable storage device according to a defined rotational direction comprises:
    randomly generating a group of rotational direction parameter values according to the defined rotational directions;
    retrieving from the computer readable storage device a number of pictures the number of which equal to the number of parameter values in the group of rotational direction parameter values; and
    rotating the pictures according to the group of rotational direction parameter values.

4. The system as recited in claim 3, wherein providing the picture to the client comprises:
    combining the retrieved pictures into a resultant picture;
    providing the resultant picture to the client or providing the retrieved pictures to the client in a flash form.

5. The method as recited in claim 1, wherein rotating a picture retrieved from the computer readable storage device according to a defined rotational direction comprises:
    retrieving a plurality of pictures from the computer readable storage device; and
    randomly rotating the plurality of picture retrieved from the computer readable storage device according to one or more defined rotational directions.

6. An apparatus for user verification, comprising:
    a processor; and
    a computer readable storage device storing instructions that, when executed by the processor, comprise:
    a pre-store unit that stores a plurality of pictures in a database;
    a definition unit that defines a plurality of rotational directions;
    a rotation unit that rotates a picture retrieved from the database according to a defined rotational direction in response to receiving from a client a request for a checkcode;
    an output unit that outputs the rotated picture to the client;
    a receiving unit that receives a rotational direction of the picture from the client; and
    a verification unit that identifies a correlation between an identification of the client and the rotational direction of the retrieved picture according to the identification of the client, and determines whether the rotational direction of the picture received from the client matches the rotational direction of the rotating picture retrieved from the database,
    wherein user verification is indicated when the rotational direction of the picture received from the client matches the rotational direction of the rotating picture retrieved from the database.

7. The apparatus as recited in claim 6, wherein the definition unit comprises:
    a direction setup unit that establishes a plurality of rotational directions; and a direction match unit that associates each rotational direction with a parameter value according to an order that the rotational directions are established.

8. The apparatus as recited in claim 7, wherein the rotation unit comprises:
  a random generation unit that randomly generates a group of rotational direction parameter values according to the defined rotational directions;
  a rotation extraction unit that retrieves a number of pictures, the number of the retrieved pictures equal to the number of parameter values in the group of rotational direction parameter values; and
  a picture rotation unit that rotates the pictures according to the group of rotational direction parameter values.

9. The apparatus as recited in claim 6, wherein the rotation unit comprises:
  a picture extraction unit that retrieves a number of pictures from the database; and
  a random rotation unit that randomly rotates the retrieved pictures according to the defined rotational directions.

10. A server for user verification, comprising:
  a processor;
  a database that stores a plurality of pictures; and
  a computer readable storage device storing instructions that, when executed by the processor, comprise:
    a checkcode generation module that rotates a picture retrieved from the database according to a defined rotational direction in response to receiving from a client a request for a checkcode, and provides the rotated picture to the client; and
    a user verification module that identifies a correlation between an identification of the client and the rotational direction of the retrieved picture according to the identification of the client after receiving a rotational direction of the picture from the client, and determines whether the rotational direction of the picture received from the client matches the rotational direction of the rotating picture retrieved from the checkcode generation module,
    wherein user verification is indicated when the rotational direction of the picture received from the client matches the rotational direction of the rotating picture retrieved from the checkcode generation module.

11. The server as recited in claim 10, wherein the instructions, when executed by the processor, further comprises:
  a definition module that defines the of rotational direction for the retrieved picture.

12. The server as recited in claim 11, wherein the definition module comprises:
  a direction setup module that establishes a plurality of rotational directions; and
  a direction match module that associates each rotational direction with a parameter value according to an order that the rotational directions are established.

13. The server as recited in claim 10, wherein the checkcode generation further module comprises:
  a picture extraction module that retrieves a number of pictures from the database; and
  a random rotation module that randomly rotates the retrieved pictures according to the defined rotational directions.

14. The server as recited in claim 13, wherein the checkcode generation further module comprises:
  a random generation module that randomly generates a group of rotational direction parameter values according to the defined rotational directions;
  a rotation extraction module that retrieves a number of pictures, the number of the retrieved pictures equal to the number of parameter values in the group of rotational direction parameter values; and
  a picture rotation module that rotates the pictures according to the group of rotational direction parameter values.

\* \* \* \* \*